(12) United States Patent
Kim

(10) Patent No.: US 8,979,175 B2
(45) Date of Patent: Mar. 17, 2015

(54) DRIVING CAB IN TRACTOR

(75) Inventor: Joong-Ho Kim, Chungcheongbuk-do (KR)

(73) Assignee: Daeho Co., Ltd., Geumam-Ri (KR)

( * ) Notice: Subject to any disclaimer, the term of this patent is extended or adjusted under 35 U.S.C. 154(b) by 0 days.

(21) Appl. No.: 13/878,544

(22) PCT Filed: May 24, 2011

(86) PCT No.: PCT/KR2011/003782
§ 371 (c)(1),
(2), (4) Date: Apr. 9, 2013

(87) PCT Pub. No.: WO2012/050286
PCT Pub. Date: Apr. 19, 2012

(65) Prior Publication Data
US 2013/0221704 A1    Aug. 29, 2013

(30) Foreign Application Priority Data

Oct. 11, 2010 (KR) ........................ 10-2010-0098604

(51) Int. Cl.
| | | |
|---|---|---|
| *B60N 99/00* | (2006.01) | |
| *B62D 33/063* | (2006.01) | |
| *B60N 2/14* | (2006.01) | |
| *B62D 33/06* | (2006.01) | |
| *B62D 33/067* | (2006.01) | |
| *B62D 33/073* | (2006.01) | |
| *B62D 49/06* | (2006.01) | |
| *E02F 9/12* | (2006.01) | |

(Continued)

(52) U.S. Cl.
CPC ............ *B62D 33/0633* (2013.01); *B60N 2/143* (2013.01); *B62D 33/0617* (2013.01); *B62D 33/067* (2013.01); *B62D 33/073* (2013.01); *B62D 49/0657* (2013.01); *B62D 49/0692* (2013.01); *E02F 9/121* (2013.01); *E02F 9/166* (2013.01); *E02F 9/2004* (2013.01); *B62D 33/0608* (2013.01); *B60W 2300/152* (2013.01)
USPC ................... 296/190.04; 180/89.13; 180/329

(58) Field of Classification Search
CPC .... B62D 33/0633; B62D 33/067; E02F 9/166
USPC ............. 296/190.04, 190.05; 180/89.13, 362, 180/329, 330
See application file for complete search history.

(56) References Cited

U.S. PATENT DOCUMENTS 4,278,144 A * 7/1981 Perin ............................. 180/329
4,480,867 A * 11/1984 Ezell et al. ................. 296/65.08

(Continued)

FOREIGN PATENT DOCUMENTS

KR 10-1999-0024996 A * 4/1999
KR 10-0678515 B1 * 2/2007

*Primary Examiner* — Lori L Lyjak
(74) *Attorney, Agent, or Firm* — John K. Park; Park Law Firm

(57) ABSTRACT

Disclosed herein is a driving cab for tractors. A hollow part is provided in a bottom plate of the driving cab, and a hollow shaft is provided in the bottom plate so as to be rotatable around the hollow part. A driver seat, an implement control device and a movement control device are fixed to the hollow shaft, so that the driver seat, the implement control device and the movement control device can be rotated along with the hollow shaft. Thereby, the implement control device and the movement control device along with the driver seat can be easily turned in a desired direction. When the tractor is required to be moved forwards or backwards, the implement control device and the movement control device along with the driver seat can face in the direction in which the tractor moves, so that the driver can easily control movement of the tractor.

20 Claims, 8 Drawing Sheets

(51) Int. Cl.
*E02F 9/16* (2006.01)
*E02F 9/20* (2006.01)

(56) References Cited

U.S. PATENT DOCUMENTS

| | | | |
|---|---|---|---|
| 4,730,691 A * | 3/1988 | Grigg | 180/329 |
| 5,664,909 A * | 9/1997 | Lindgren et al. | 404/122 |
| 6,684,969 B1 * | 2/2004 | Flowers et al. | 180/65.1 |
| 6,971,471 B2 * | 12/2005 | Baker et al. | 180/329 |
| 7,204,546 B2 * | 4/2007 | Antonetti | 296/190.04 |
| 7,500,532 B2 * | 3/2009 | Koga et al. | 180/89.13 |
| 7,673,931 B2 * | 3/2010 | Takano et al. | 296/190.01 |
| 2006/0108171 A1 * | 5/2006 | Koga et al. | 180/327 |
| 2006/0202514 A1 * | 9/2006 | Antonetti | 296/190.05 |
| 2013/0221704 A1 * | 8/2013 | Kim | 296/190.04 |

* cited by examiner

DRIVING CAB IN TRACTOR

TECHNICAL FIELD

The present invention relates, in general, to driving cabs for tractors, and more particularly, to a driving cab for a tractor which is installed on a tractor body and has therein a driver seat, an implement control device for controlling an operating implement mounted to the tractor, and a movement control device for controlling movement of the tractor, wherein a hollow part is provided in a bottom plate of the driving cab, a hollow shaft is provided in the bottom plate so as to be rotatable around the hollow part, and the driver seat, the implement control device and the movement control device are fixed to the hollow shaft, so that when the hollow shaft rotates, the driver seat, the implement control device and the movement control device are rotated along with the hollow shaft, whereby, when working, the implement control device and the movement control device along with the driver seat can be turned in a desired direction so that a driver can face a target area and comfortably carry out work, and when the tractor is required to be moved forwards or backwards, the implement control device and the movement control device along with the driver seat can face in the direction in which the tractor moves, so that the driver can easily control forward or backward movement of the tractor.

BACKGROUND ART

Generally, a tractor is an engineering vehicle designed to deliver a high tractive force and conduct different kinds of work in the agriculture or construction field. At present, tractors for agriculture typically include a front loader provided on a front end of a tractor body, and an attachment mounted to the front loader so as to conduct various kinds of work, such as transportation, unloading, loading, etc.

Typical tractors include a driving cab provided on a tractor body. A driver seat on which a driver sits, an implement control device which controls an operating implement mounted to the tractor, and a movement control device which controls movement of the tractor are installed in the driving cab.

The driver seat, the implement control device and the movement control device are fixed to a bottom plate of the driving cab. Thus, when a driver conducts work with respect to an area in front of the tractor, the driver can directly conduct work. However, if work with respect to an area beside or in back of the tractor is required, the tractor must be turned towards the area where work is required. This increases working time and reduces work efficiency.

Furthermore, when it is required to move the tractor backwards, the driver must turn his/her head backwards and manipulate the movement control device while looking backwards. At this time, an event in which the tractor does not correctly move backwards with the result that the driver makes a mistake in manipulating the movement control device is frequently induced.

In addition, in the conventional tractor, the driving cab is fixed on the body frame. Thus, if an engine is disposed below the driving cab, it is impossible to repair or maintain the engine. Therefore, the engine is typically installed, for example, in front of the driving cab rather than being disposed below the driving cab. This disposition of the engine increases the entire size of the tractor body.

DISCLOSURE

Technical Problem

Accordingly, the present invention has been made keeping in mind the above problems occurring in the prior art, and an object of the present invention is to provide a driving cab for tractors which is installed on a tractor body and has therein a driver seat, an implement control device for controlling an operating implement mounted to the tractor, and a movement control device for controlling movement of the tractor, which is configured such that the implement control device and the movement control device can rotate along with the driver seat, whereby, when working, the implement control device and the movement control device along with the driver seat are turned in a desired direction so that a driver can face a target area and comfortably carry out the work, and when the tractor moves forwards or backwards, the implement control device and the movement control device along with the driver seat can face in the direction in which the tractor moves such that the driver can easily control forward or backward movement of the tractor.

Another object of the present invention is to provide a driving cab which is disposed above an engine and is configured such that the driving cab can be tilted to the left or the right so that an area below the driving cab can be open, thus making it easy for a worker to access the engine to conduct maintenance or repair of the engine disposed below the driving cab.

Technical Solution

In order to accomplish the above objects, the present invention provides a driving cab installed on a body of a tractor, the driving cab having therein a driver seat, an implement control device for controlling an operating implement mounted to the tractor, and a movement control device for controlling movement of the tractor, wherein a hollow part is provided in a bottom plate of the driving cab, a hollow shaft is provided in the bottom plate so as to be rotatable around the hollow part, and the driver seat, the implement control device and the movement control device are fixed to the hollow shaft, so that the driver seat, the implement control device and the movement control device are rotated by rotation of the hollow shaft.

Furthermore, box-shaped frames may extend forwards and sideways from the hollow shaft, and a box may protrude upwards from an end of each of the box-shaped frames, wherein the driver seat, the implement control device and the movement control device are rotated by rotation of the hollow shaft.

Among the boxes protruding upwards from the ends of the box-shaped frames, a box that is disposed at a front side may be provided with a steering wheel, and pedals may be installed below the steering wheel. Among the boxes protruding upwards from the ends of the box-shaped frames, boxes that are disposed at left and right sides may be provided with an implement control lever and control buttons.

The pedals may comprise an accelerator pedal and a brake pedal, and an actuating shaft of the brake pedal extends towards the hollow shaft.

Among the boxes protruding upwards from the ends of the box-shaped frames, the pedals may be disposed at left and right sides of the box that is disposed at the front side.

Further, master cylinders for transmission of actuating forces of the pedals, a cable and a hose may be housed in the box-shaped frame that extends forwards from the hollow shaft.

Furthermore, hoses and cables that are led from an implement control lever and control buttons may be housed in the box-shaped frames that extend to the left and right from the hollow shaft, wherein the hoses and cables may be led into the hollow part and extended to the outside of the driving cab.

The hollow shaft may be rotated manually or automatically.

In addition, a disc table may be provided on the bottom plate so as to be rotatable around the hollow shaft, so that the driver seat, the implement control device and the movement control device are rotated by rotation of the disc table.

A disc table may be provided on the bottom plate, and the hollow shaft, the box-shaped frame and the boxes that protrude upwards may be fixed to the disc table, so that the driver seat, the implement control device and the movement control device are rotated by rotation of the disc table.

A disc table may be provided on upper portions of the box-shaped frames, so that the driver seat, the implement control device and the movement control device are rotated by rotation of the disc table.

The disc table may be rotated manually or automatically.

Furthermore, a tapered hole may be formed at a predetermined position in the bottom plate, and a tapered pin may be inserted into the tapered hole so that the disc table can be fixed to the bottom plate.

The driving cab may be disposed above an engine, and a coupling bar may be extend a predetermined length from a lower end of a first side of the driving cab, wherein an end of the coupling bar is hinged to a body frame so that the driving cab can be tilted to the left or the right, whereby an area below the driving cab can be open.

Further, a stopper may be further provided and configured such that, when the driving cab is tilted to a predetermined extent, the driving cab can no longer be tilted.

In addition, a lower end of a second side of the driving cab may be provided with a rubber buffer and be coupled to the body frame.

Advantageous Effects

A driving cab for a tractor according to the present invention has therein a driver seat, an implement control device for controlling an operating implement mounted to the tractor, and a movement control device for controlling movement of the tractor. The driving cab is configured such that the implement control device and the movement control device can rotate along with the driver seat. Thereby, when the direction of work alters while working, the driver has only to rotate the driver seat in a desired direction in place without moving the entirety of the tractor. Furthermore, when the tractor is required to be moved backwards, because the driver seat and the movement control device can be simply oriented rearwards, it is unnecessary for the driver to turn the entirety of the tractor or drive the tractor backwards while looking back.

Moreover, in the present invention, the driving cab is disposed above an engine and is configured such that the driving cab can be tilted to the left or the right so that an area below the driving cab can be open, thus making it easy for a worker to access the engine to conduct maintenance or repair of the engine disposed below the driving cab. Further, because the engine is disposed below the driving cab, the size of the tractor body can be reduced.

DESCRIPTION OF THE REFERENCE NUMERALS IN THE DRAWINGS

Figure 1:
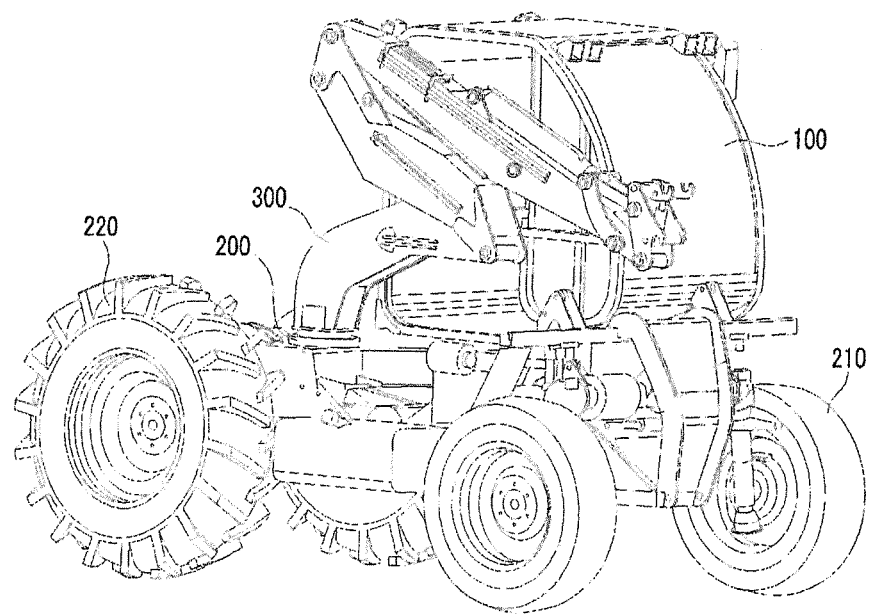
FIG. 1 is a perspective view illustrating an embodiment of a tractor that uses the present invention.

10: bottom plate 11: circular depression
12: hollow part 13: tapered hole
20: driver seat 30: box-shaped frame
31: disc table 41: control panel
42: implement control lever 43: gear shift lever
44: arm control lever 45: cable
51: steering wheel 52: steering controller
53: accelerator pedal 54, 55: brake pedal
56: clutch pedal 58: master cylinder
60: hollow shaft 70: stopper control lever
71: tapered pin 80: coupling bar
81, 201: coupling part 82: hydraulic cylinder
83: hinge 84: stopper
100: driving cab 200: body frame
210: front wheel 220: rear wheel
300: articulated arm

BEST MODE

Hereinafter, a driving cab for tractors according to the present invention will be described in detail with reference to the attached drawings.

FIG. 1 is a perspective view illustrating an embodiment of a tractor that uses the present invention. In the tractor with the driving cab according to the present invention, the driving cab 100 having a driver seat therein is located on a left side portion of a body frame 200 of the tractor, and an articulated arm 300 is disposed on a portion of the body frame 200 where the driving cab 100 is not located, so as to maintain the balance of the tractor. In detail, the driving cab 100 is disposed between front wheels 210 and rear wheels 220 of the tractor and located on the left side portion of the tractor such that a space is formed beside the driving cab 100. When the articulated arm 300 is not in use, the articulated arm 300 is maintained in a folded state in this space. The present invention is not limited to the structure of the tractor of FIG. 1 and can be applied to any kind of tractor, so long as the tractor is configured such that the driving cab 100 is installed on the body frame 200.

As shown in FIGS. 2 through 7, the driving cab according to the present invention includes a driver seat 20 on which a driver sits, an implement control device which controls an operating implement mounted to the tractor, and a movement control device which controls movement of the tractor. The driving cab is installed on the body frame 200.

The implement control device functions to control the operating implement mounted to the tractor. The implement control device is disposed around left and right sides of the driver seat 20. The implement control device includes an implement control lever 42 which has a joystick structure and manipulates an operating implement (for example, a bucket or the like mounted to an end of the articulated arm 300, e.g., moves it upwards or downwards, and an arm control lever 44 which has a joystick structure and rotates the articulated arm 300 upwards, downwards, leftwards or rightwards. Further, the implement control device includes all the other elements which are used to control the operating implement installed on the tractor.

The movement control device is disposed ahead of the driver seat 20. The movement control device includes a steering wheel 51 which controls the direction in which the tractor moves, a steering controller 52 which steers the front wheels 210 and the rear wheels 220 in response to rotation of the steering wheel 51, an accelerator pedal 53 which accelerates the tractor, a right or left brake pedal 54 or 55 which decelerates or stops the tractor, and a clutch pedal 56 which controls a clutch for gear shift. A gear shift lever 43 which shifts the gears of the tractor is disposed at a right side of the driver seat 20. In the case of an automatic transmission, the clutch pedal 56 is not required.

A hollow part 12 is provided in a central portion of the bottom of the driving cab 100. Furthermore, a hollow shaft 60 is provided so as to be rotatable around the hollow part 12.

The driver seat 20, the implement control device that includes the implement control lever 42 and the arm control lever 44, and the movement control device that includes the steering wheel 51, the steering controller 52 and the pedals 53, 54, 55 and 56 are fixed to the hollow shaft 60. Thus, when the hollow shaft 60 is rotated, the driver seat 20, the implement control device and the movement control device are rotated along with the hollow shaft 60.

Furthermore, a box-shaped frame 30 extends from the hollow shaft 60 forwards and sideways to protect cables 45 such as electric wires and hoses such as hydraulic lines which are led from the implement control device and the movement control device that are fixed to the hollow shaft 60. The box-shaped frame 30 has an appropriate height and width to receive and protect the cables 45 or the like.

The box-shaped frame 30 includes a front box which protrudes upwards from a front end of the box-shaped frame 30 to form a passage for receiving the cables 45 and hoses that are led from the steering wheel 51. Master cylinders, which transmit actuating force of the pedals to corresponding elements, and the associated cables and hoses, are housed in the front box that protrudes upwards from the front end of the box-shaped frame 30. The steering wheel is installed on an upper end of the front box. The pedals 53, 54, 55 and 56 are installed around a lower end of the front box. In detail, the pedals 53, 54, 55 and 56 are disposed at left and right sides of the front box that protrudes upwards from the front end of the box-shaped frame 30.

Each of the pedals 54, 55 and 56 has an actuating shaft. The actuating shaft extends towards the hollow shaft 60 such that when the hollow shaft 60 is rotated, the pedals 54, 55 and 56 can be smoothly rotated along with the hollow shaft 60.

Furthermore, side boxes protrude upwards from respective side ends of the box-shaped frame 30. The side boxes form passages for receiving the cables 45 and hoses that are led from the implement control lever 42, the arm control lever 44, etc. The control lever 42 and 44, control buttons, etc. are installed on upper ends of the side boxes.

Further, a control panel 41 is disposed at a right or left side of the driver seat 20. The control panel 41 includes a starter switch for the tractor, a switch for turning on/off the power of a PTO (power take-off device which is provided in a rear portion of the tractor to operate different kinds of operating implements mounted to the tractor.

The cables 45 and the hoses that are enclosed by the box-shaped frame 30 and the front and side boxes protruding from the box-shaped frame 30 are led into the hollow part 12 and are extended out of the driving cab.

A circular depression 11 is formed in a bottom plate 10 of the driving cab 100. A disc table 31 is rotatably placed in the circular depression 11.

The disc table 31 is fixed to the hollow shaft 60. Thus, rotation of the disc table 31 may depend on rotation of the hollow shaft 60 or, alternatively, rotation of the hollow shaft 60 may depend on rotation of the disc table 31. The box-shaped frame 30 and the front and side boxes that protrude upwards from the front, left and right ends of the box-shaped frame 30 are fixed on an upper surface of the disc table 31.

Figure 8:
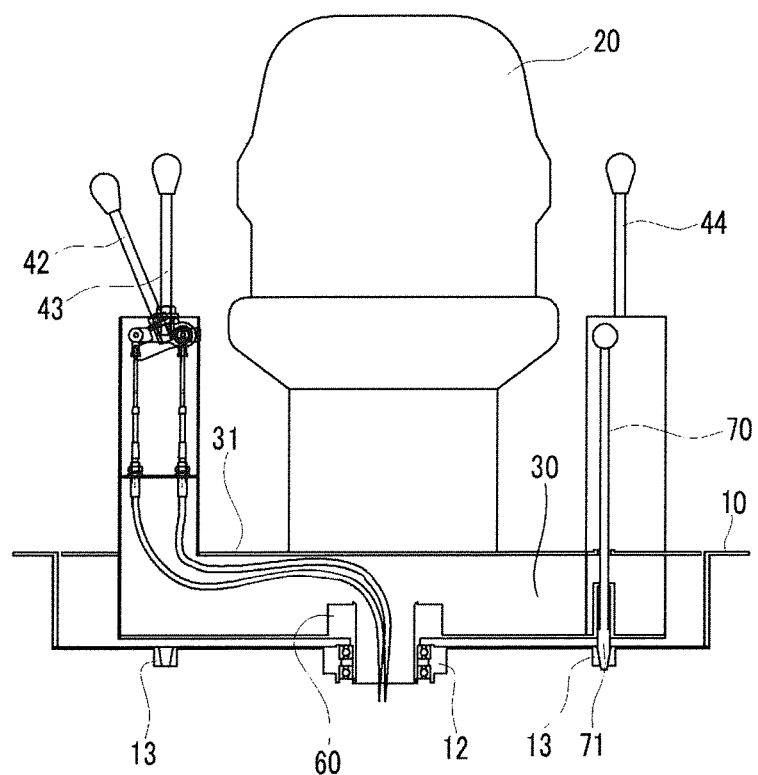
FIG. 8 is a view illustrating another embodiment of the present invention.

In another embodiment of the disc table 31, as shown in FIG. 8, the disc table 31 is installed in the bottom plate 10 so as to be rotatable around the hollow shaft 60. Thus, as the disc table 31 rotates, the driver seat, the implement control device and the movement control device are rotated along with the disc table 31. Alternatively, the disc table 31 may be fixed on an upper surface of the box-shaped frame 30 and configured such that when the disc table 31 rotates, the driver seat 20, the implement control device and the movement control device are rotated along with the disc table 31. In this case, only the front and side boxes that protrude upwards may be provided on the upper surface of the disc table 31 without using the box-shaped frame 30.

Because the disc table 31 has the above-mentioned installation structure, the driver seat 20, the implement control device and the movement control device can be rotated by the rotation of the hollow shaft 60 and the disc table 31.

The present invention is characterized by the fact that the driver seat 20, the implement control device and the movement control device can be rotated together.

The detailed disposition of the implement control device, the movement control device, etc. is not limited to the examples illustrated in the drawings and can be changed depending on use conditions, requirements of consumers, and so on.

To explain the structure of the driving cab 100 according to an embodiment of the present invention in detail, it is configured such that the disc table 31 is rotatably installed in the circular depression 11, and the hollow shaft 60, the box-shaped frame 30 and the front and side boxes are fixed on the disc table 31 so that when the disc table 31 rotates, the driver seat 20, the implement control device and the movement control device are rotated together.

In the driving cab 100, the circular depression 11 is formed in the bottom plate 10. The disc table 31, to which the seat 20, the implement control device, the movement control device, etc. are fixed, is placed in the circular depression 11. Preferably, the diameter of the circular depression 11 is slightly larger than that of the disc table 31 so that the disc table 31 can be smoothly rotated in the circular depression 11.

Figure 5:
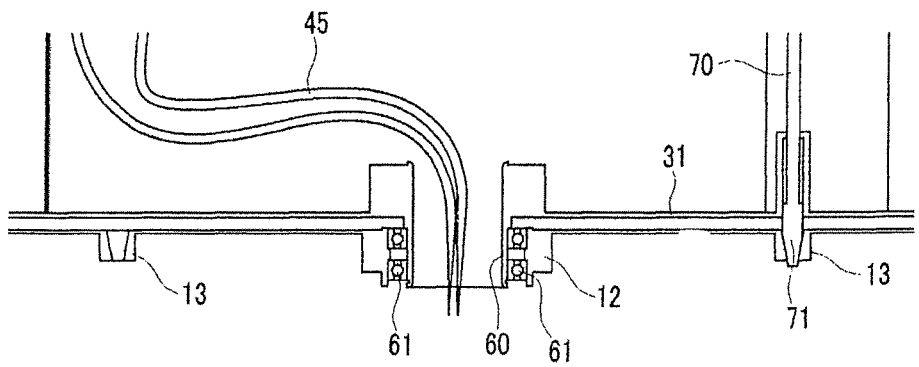
FIG. 5 is a view illustrating a disc table according to the present invention in detail.
Figure 6:
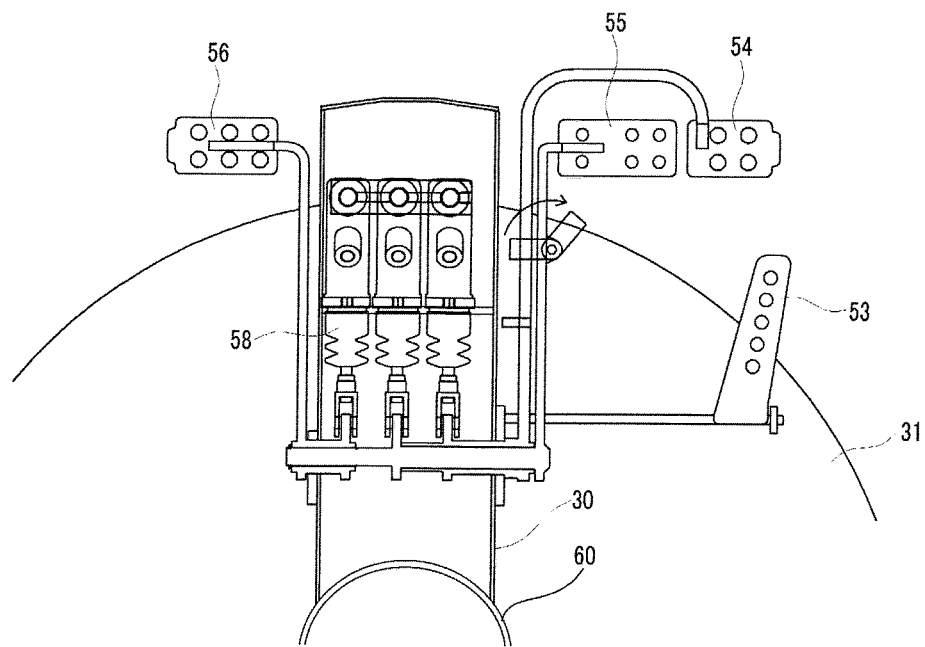
FIG. 6 is a view showing a movement control device according to the present invention.

As shown in FIG. 5, the hollow shaft 60 that has an internal space of a predetermined size is formed in the central portion of the disc table 31. The hollow part 12 that has a predetermined size is formed in the central portion of the circular depression 11. The hollow shaft 60 is inserted into the hollow part 12 so that the disc table 31 can be rotated. The outer diameter of the hollow shaft 60 which is inserted into the hollow part 12 is smaller than the inner diameter of the hollow part 12. At least one bearing 61 is installed between a circumferential outer surface of the hollow shaft 60 and a circumferential inner surface of the hollow part 12, thus making the rotation of the hollow shaft 60 smoother. The cables 45 and the hoses that are led from the control device, etc. pass through the internal space of the hollow shaft 60 in such a way that the cables are prevented from being entangled when the disc table 31 is rotated.

Furthermore, a tapered hole 13 is formed at a predetermined position at an inner surface of the circular depression 11. A tapered pin 71 that functions as a stopper is installed in the disc table 31 just above the tapered hole 13. The tapered pin 71 is removably inserted into the tapered hole 13. A stopper control lever 70 integrally extends upright from the tapered pin 71 that functions as the stopper. Thus, when the stopper control lever 70 is pushed downwards, the tapered pin 71 is moved downwards and inserted into the tapered hole 13, whereby the disc table 31 is fixed to the bottom plate 10.

With regard to the tapered hole 13 that is formed at the predetermined position in the inner surface of the circular depression 11, the entire circumference of a circle formed at a predetermined position in the inner surface of the circular depression may form the tapered hole. Alternatively, a plurality of tapered holes may be formed at predetermined positions in the same circle so that the driving cab can be oriented in a desired direction and fixed.

The operation of rotating the disc table 31 and the operation of fixing the disc table 31 in one place will now be explained. When a driver who is sitting on the driver seat 20 that is installed on the central portion of the disc table 31 manually rotates the driver seat 20, the disc table 31 is rotated. When the driver seat 20 is rotated to a desired position, the driver stops the rotation of the driver seat 20 and pushes the stopper control lever 70 that is disposed at a right or left side of the driver seat 20 (in the drawings, illustrated as being disposed at the right side. Then, the tapered pin 71 provided on the end of the stopper control lever 70 is inserted into the tapered hole 13 formed in the inner surface of the circular depression 11 so that the driver seat 20 and the disc table 31 can be fixed at the desired position.

Although the operation of rotating or fixing the driver seat 20 and the disc table 31 have been illustrated as being manually conducted, a structure in which the driver seat 20 and the disc table 31 are rotated or fixed by a power generation means such as an electric motor, a hydraulic motor, etc. also falls within the bounds of the present invention.

Figure 7:
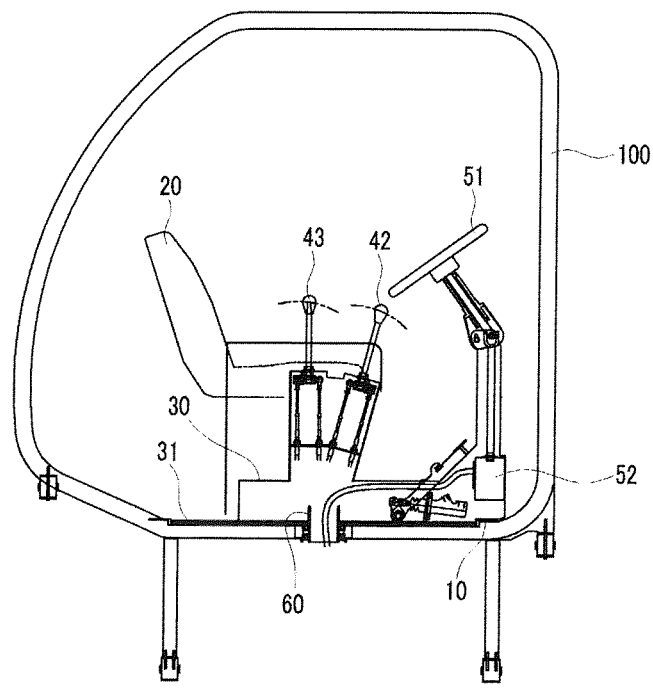
FIG. 7 is a side view illustrating the driving cab that has been rotated rearwards from the state of FIG. 2.

FIG. 7 is a side view showing the driver seat 20 and the disc table 31 which have been rotated rearwards and fixed in the rotated state.

Figure 9:
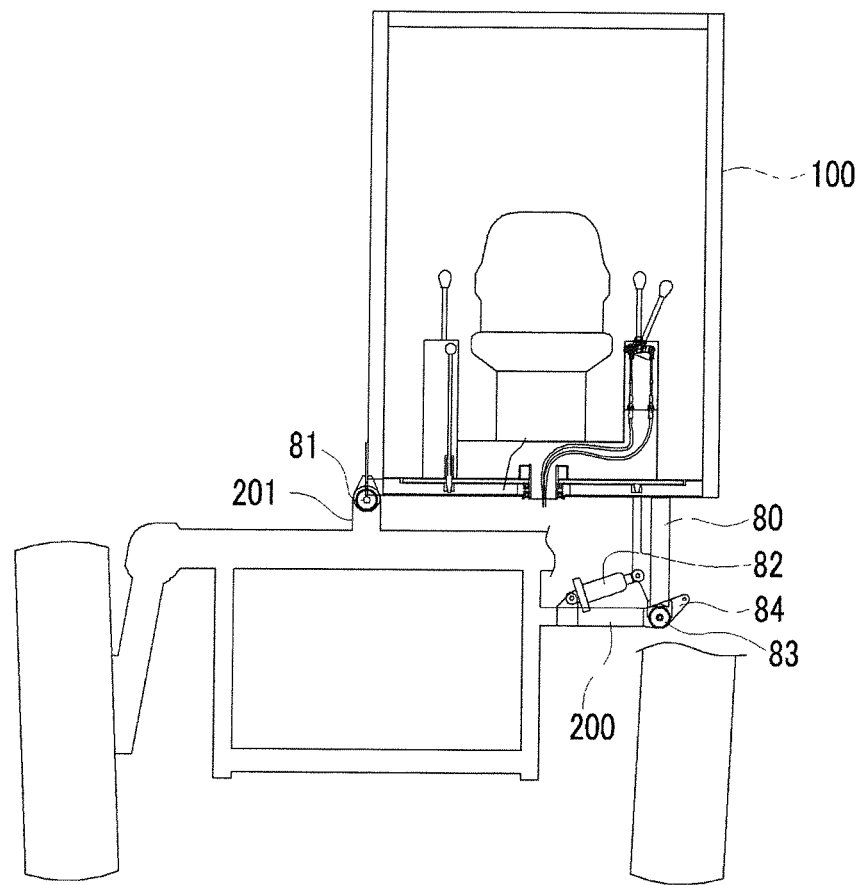
FIG. 9 is a view showing the driving cab provided on a body frame of the tractor according to the present invention.
Figure 10:
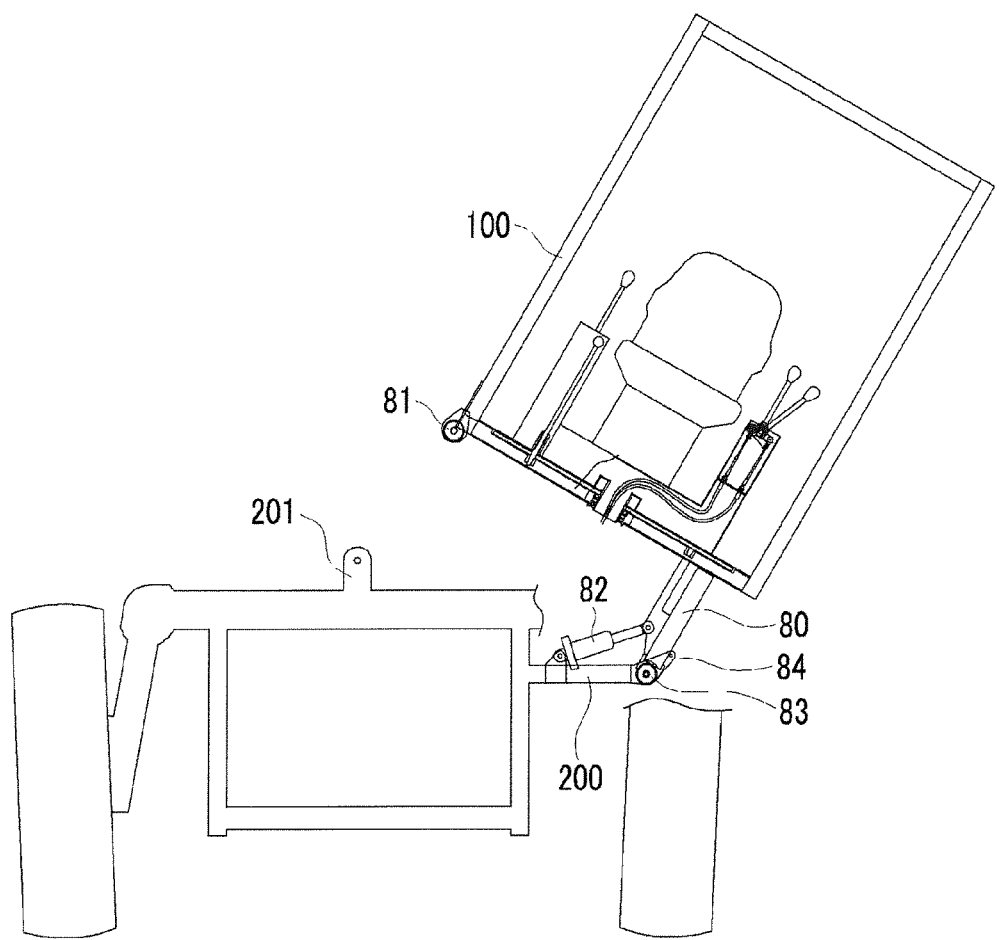
FIG. 10 is a view showing the driving cab that has been tilted on the tractor according to the present invention.

Meanwhile, in another embodiment of the present invention, the driving cab 100 is configured such that it can be tilted to the left or the right so that an area below the driving cab 100 can be open. Hereinafter, the driving cab 100 of this embodiment will be described in detail with reference to FIGS. 9 and 10.

Figure 2:
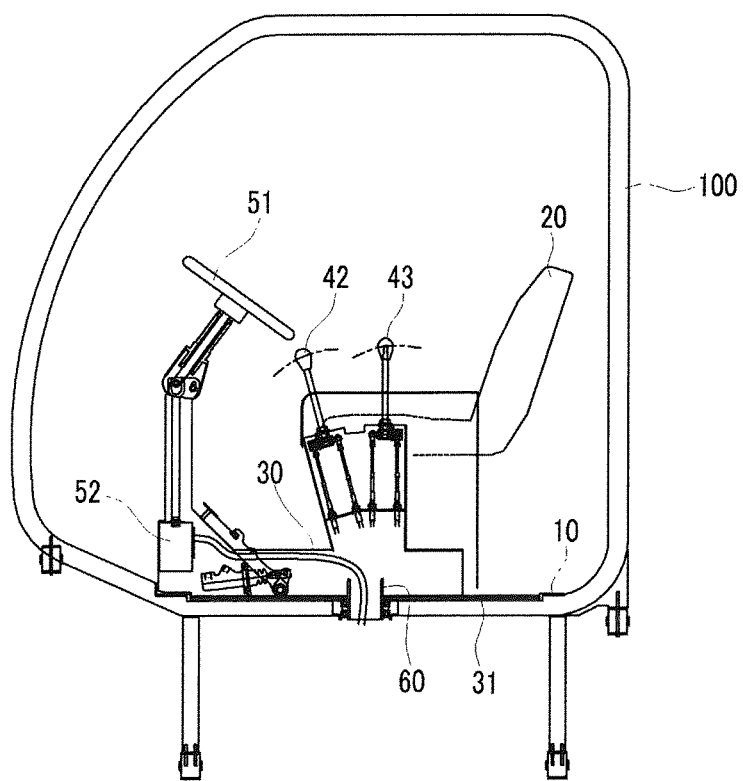
FIG. 2 is a side view showing the interior of a driving cab for tractors according to the present invention.
Figure 3:
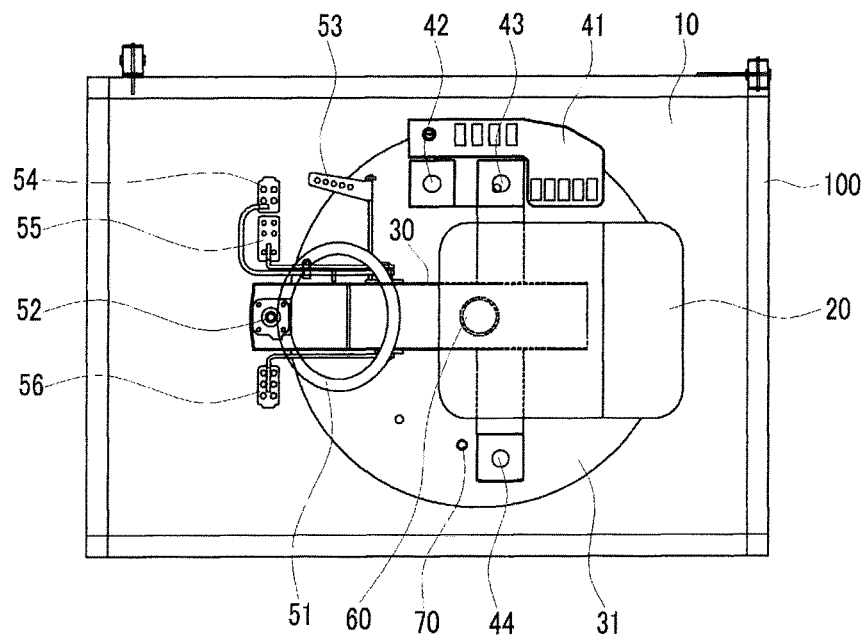
FIG. 3 is a plan view showing the interior of the driving cab according to the present invention.
Figure 4:
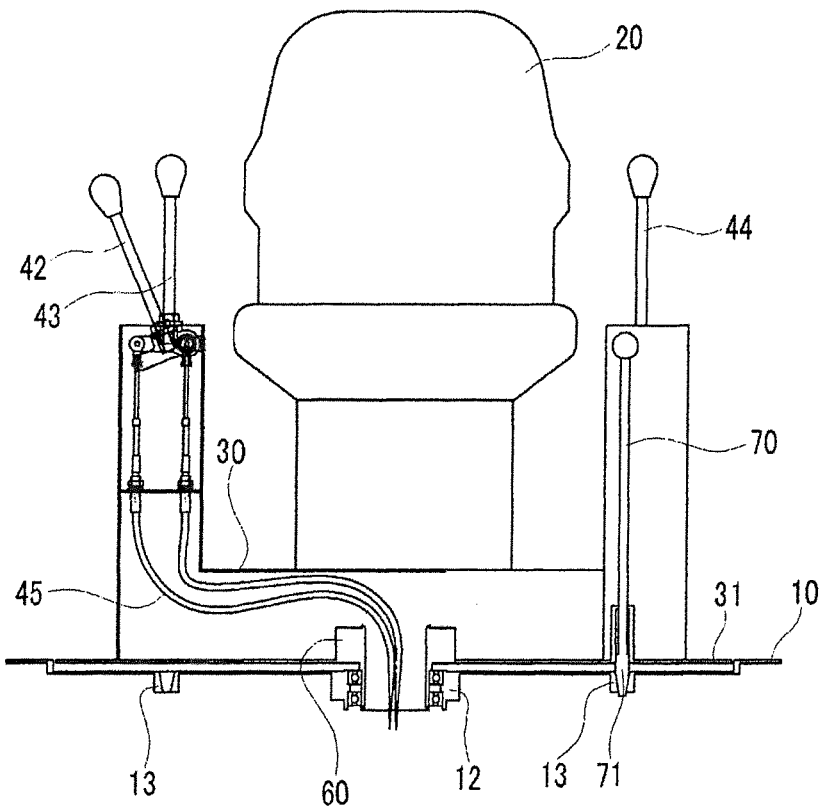
FIG. 4 is a front view showing the interior of the driving cab according to the present invention.

At least one coupling bar 80 (in FIGS. 2 and 7, two coupling bars 80 extends downwards from a lower end of one side of the driving cab 100. A lower end of the coupling bar 80 is coupled to the body frame 200 by a hinge 83. A coupling part 81 having a rubber buffer is provided under a lower end of the other side of the driving cab 100. The coupling part 81 is removably fixed by a locking pin (not shown to a coupling part 201 which is provided on the body frame 200.

Further, an actuating rod of a hydraulic cylinder 82 is connected to a predetermined portion of the coupling bar 80. Thus, when the hydraulic cylinder 82 is extended, the coupling bar 80 is tilted around the hinge 83 so that the driving cab 100 which is fixed on the coupling bar 80 can be tilted outwards to the left or the right with respect to the body frame 200. As a result, the area below the driving cab 100 opens.

A stopper 84 is provided on the hinge 83. When the driving cab 100 is tilted to a predetermined extent, the stopper 84 comes into contact with a side of the coupling bar 80 so that the driving cab 100 can no longer be tilted.

In the embodiment of the present invention configured such that the driving cab 100 can be tilted to the left or the right to open the area below the driving cab 100, an engine can be located below the driving cab 100. In this case, a worker can easily access the engine to conduct maintenance or repair of the engine that is disposed below the driving cab 100.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A driving cab installed on a body of a tractor, the driving cab having therein a driver seat, an implement control device for controlling an operating implement mounted to the tractor, and a movement control device for controlling movement of the tractor,
    wherein a hollow part is provided in a bottom plate of the driving cab, a hollow shaft is provided in the bottom plate so as to be rotatable around the hollow part, and the driver seat, the implement control device and the movement control device are fixed to the hollow shaft, so that the driver seat, the implement control device and the movement control device are rotated by rotation of the hollow shaft.

2. The driving cab according to claim 1, wherein box-shaped frames extend forwards and sideways from the hollow shaft, and a box protrudes upwards from an end of each of the box-shaped frames, wherein the driver seat, the implement control device and the movement control device are rotated by rotation of the hollow shaft.

3. The driving cab according to claim 2, wherein, among the boxes protruding upwards from the ends of the box-shaped frames, a box that is disposed at a front side is provided with a steering wheel, and pedals are installed below the steering wheel, and among the boxes protruding upwards from the ends of the box-shaped frames, boxes that are disposed at left and right sides are provided with an implement control lever and control buttons.

4. The driving cab according to claim 3, wherein the pedals comprise an accelerator pedal and a brake pedal, and an actuating shaft of the brake pedal extends towards the hollow shaft.

5. The driving cab according to claim 3, wherein, among the boxes protruding upwards from the ends of the box-shaped frames, the pedals are disposed at left and right sides of the box that is disposed at the front side.

6. The driving cab according to claim 3, wherein master cylinders for transmission of actuating forces of the pedals, a cable and a hose are housed in the box-shaped frame that extends forwards from the hollow shaft.

7. The driving cab according to claim 2, wherein hoses and cables that are led from an implement control lever and control buttons are housed in the box-shaped frames that extend to the left and right from the hollow shaft, wherein the hoses and cables are led into the hollow part and extended to the outside of the driving cab.

8. The driving cab according to claim 1, wherein the hollow shaft is rotated manually or automatically.

9. The driving cab according to claim 1, wherein a disc table is provided on the bottom plate so as to be rotatable around the hollow shaft, so that the driver seat, the implement control device and the movement control device are rotated by rotation of the disc table.

10. The driving cab according to claim 2, wherein a disc table is provided on the bottom plate, and the hollow shaft, the box-shaped frame and the boxes that protrude upwards are fixed to the disc table, so that the driver seat, the implement control device and the movement control device are rotated by rotation of the disc table.

11. The driving cab according to claim 2, wherein a disc table is provided on upper portions of the box-shaped frames, so that the driver seat, the implement control device and the movement control device are rotated by rotation of the disc table.

12. The driving cab according to claim 9, wherein the disc table is rotated manually or automatically.

13. The driving cab according to claim 9, wherein a tapered hole is formed at a predetermined position in the bottom plate, and a tapered pin is inserted into the tapered hole so that the disc table can be fixed to the bottom plate.

14. The driving cab according to claim 1, wherein the driving cab is disposed above an engine, and a coupling bar extends a predetermined length from a lower end of a first side of the driving cab, wherein an end of the coupling bar is hinged to a body frame so that the driving cab can be tilted to the left or the right, whereby an area below the driving cab can be open.

15. The driving cab according to claim 14, wherein a stopper is further provided and configured such that, when the driving cab is tilted to a predetermined extent, the driving cab can no longer be tilted.

16. The driving cab according to claim 15, wherein a lower end of a second side of the driving cab is provided with a rubber buffer and is coupled to the body frame.

17. The driving cab according to claim 14, wherein a lower end of a second side of the driving cab is provided with a rubber buffer and is coupled to the body frame.

18. The driving cab according to claim 10, wherein the disc table is rotated manually or automatically.

19. The driving cab according to claim 11, wherein the disc table is rotated manually or automatically.

20. The driving cab according to claim 10, wherein a tapered hole is formed at a predetermined position in the bottom plate, and a tapered pin is inserted into the tapered hole so that the disc table can be fixed to the bottom plate.

\* \* \* \* \*